United States Patent
Liu et al.

(10) Patent No.: US 9,585,026 B2
(45) Date of Patent: Feb. 28, 2017

(54) METHOD, APPARATUS AND SYSTEM FOR SECONDARY SYSTEM REGISTERING IN DATABASE

(71) Applicant: ZTE CORPORATION, Shenzhen, Guangdong Province (CN)

(72) Inventors: Xing Liu, Shenzhen (CN); Yan Li, Shenzhen (CN); Bin Wang, Shenzhen (CN); Ting Miao, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 150 days.

(21) Appl. No.: 14/429,881

(22) PCT Filed: Aug. 30, 2013

(86) PCT No.: PCT/CN2013/082709
§ 371 (c)(1),
(2) Date: Mar. 20, 2015

(87) PCT Pub. No.: WO2014/044118
PCT Pub. Date: Mar. 27, 2014

(65) Prior Publication Data
US 2015/0215788 A1 Jul. 30, 2015

(30) Foreign Application Priority Data
Sep. 21, 2012 (CN) .......................... 2012 1 0353541

(51) Int. Cl.
*H04B 15/00* (2006.01)
*H04W 4/00* (2009.01)
(Continued)

(52) U.S. Cl.
CPC ............. *H04W 16/14* (2013.01); *H04L 63/08* (2013.01); *H04W 12/06* (2013.01); *H04W 48/02* (2013.01); *H04W 60/04* (2013.01)

(58) Field of Classification Search
CPC .... H04W 74/00; H04W 4/00; G06F 17/30595
(Continued)

(56) References Cited

U.S. PATENT DOCUMENTS

2004/0030562 A1* 2/2004 Williams .............. H04W 16/18
705/325
2008/0279108 A1* 11/2008 Beziot ................. H04L 12/5695
370/241
(Continued)

FOREIGN PATENT DOCUMENTS

CN 102170319 A 8/2011
CN 102474729 A 5/2012
(Continued)

*Primary Examiner* — Kiet Doan
(74) *Attorney, Agent, or Firm* — Ling Wu; Stephen Yang; Ling and Yang Intellectual Property

(57) ABSTRACT

A method, apparatus and system for a secondary system registering in a database, the method includes: a database receiving a registration request sent by a secondary system; and the database processing the registration of the secondary system. A database device includes: a receiving module, a registration processing module and a sending module; the secondary system includes: a network element device, a reconfiguration management node and a registration requesting module.

14 Claims, 6 Drawing Sheets

(51) Int. Cl.
*G06F 7/00* (2006.01)
*H04W 16/14* (2009.01)
*H04L 29/06* (2006.01)
*H04W 12/06* (2009.01)
*H04W 48/02* (2009.01)
*H04W 60/04* (2009.01)

(58) Field of Classification Search
USPC ... 455/411, 445, 435.1, 552.1, 67.11; 726/3; 709/245; 705/14.73, 14.51, 26.1, 14.4
See application file for complete search history.

(56) References Cited

U.S. PATENT DOCUMENTS

| | | | |
|---|---|---|---|
| 2010/0220687 A1* | 9/2010 | Reznik | H04W 36/005 370/331 |
| 2010/0261423 A1 | 10/2010 | Stanforth et al. | |
| 2011/0250915 A1 | 10/2011 | Stanforth et al. | |
| 2011/0282915 A1* | 11/2011 | Steer | H04L 63/06 707/802 |
| 2012/0094681 A1 | 4/2012 | Freda et al. | |

FOREIGN PATENT DOCUMENTS

| | | |
|---|---|---|
| CN | 102685752 A | 9/2012 |
| WO | 2012003566 A | 1/2012 |
| WO | 2012098481 A | 7/2012 |

* cited by examiner

METHOD, APPARATUS AND SYSTEM FOR SECONDARY SYSTEM REGISTERING IN DATABASE

TECHNICAL FIELD

The present document relates to the field of wireless communications, and more particularly, to a method, apparatus and system for a secondary system registering in a database.

BACKGROUND

With the constant progress of radio technology, various radio services emerge in large numbers, but the spectrum resources on which the radio services rely are limited, and the spectrum resources appear to be very short facing the increasing demands for bandwidth, and on the other hand, the spectrum resource utilization is not high in the traditional mode of fixed spectrum allocation. In a sense, this spectrum allocation system in which the spectrum resources are fixedly allocated to the authorized systems results in the extreme shortage of the spectrum resources. The cognitive radio (CR) technology breaks the system of fixed spectrum allocation in the traditional sense, and dynamically allocates the spectrums between systems, and improves the efficiency of spectrum utilization. Typically, for example, with the continuous increasing of people's daily communication needs, it is not satisfied with simple voice data communications any more, and the proportion of video streaming services in people's communications in their lives keeps increasing, which requires support of more bandwidth, the International Mobile Telecommunications (briefly called IMT) system shows an unprecedented shortage of spectrums. But for the broadcast and television system, the spectrum resources has available room to a large extent, for example, some spectrums in the broadcast and television system have not been used in some areas; although some spectrums in the broadcast and television system have coverage in some areas, they are not used in some moments, the overall utilization is relatively low. The mode of fixed spectrum allocation makes the abovementioned unused spectrum resources cannot be reused, for example, the unused spectrum resources cannot be used by the International Mobile Telecom (IMT) system. The cognitive radio technology solves this problem, that is, the IMT system opportunistically occupies the TV White Space (TVWS) spectrum resources according to obtained information of the broadcast and television system with the cognitive radio technology, thereby improving the utilization of spectrums in the broadcast and television system and releasing the shortage of spectrums in the IMT system. A system that opportunistically occupies the spectrums authorized to other systems is called a secondary system, and a system authorized with the spectrums is called a master system. In the above scenario, the broadcast and television system is a master system, and the IMT system is a secondary system.

At the same time of the secondary system opportunistically borrowing the spectrum resources of the master system to improve the overall network performance, it also needs to secure the quality of service of the master system. Wherein, the Geo-location Database is a recognized entity which needs to be newly added in the cognitive radio system in the TVWS frequency band and is provided by a third party, and its main role is to provide available TVWS spectrum resources for the secondary system. The secondary system uses the TVWS spectrum resources in accordance with the information provided by the database and can ensure that the secondary system does not disturb the master system. The regulatory domain makes appropriate provisions on the services provided by the database as well as the access of the secondary system to the database, typically for example, in order to facilitate the authorization of the secondary system and to timely and accurately find out the source of interference when the master system is interfered, the regulatory domain requires that a Master White Space Device (Master WSD)/Fixed Device with the control capability must register in the database before working in the TVWS spectrum, and the available spectrum list in the database can only be obtained through the registered secondary system. But there is no implementable process provided for the process of a secondary system registering in a database according to the CR (Cognition Radio) technology in the TVWS frequency band.

Due to the lack of the procedure, once the secondary system causes interference to the master system, the source of interference cannot be tracked. For example, after two operators use the same segment of TVWS in adjacent areas, the cumulative signals creates interference to the master system, and due to the lack of a registration mechanism, the master system cannot confirm the source of interference, thereby reducing the reception performance of the master system. Meanwhile, due to the lack of the procedure, it is not possible to effectively and coordinately use the TVWS among a plurality of secondary systems, and there is interference between the secondary systems. For example, the IMT systems of two operators cover the same area, and due to the lack of the procedure of database registration and authorization, the two operators do not have a channel to coordinate and they seize with each other, resulting in interference with each other and ultimately the TVWS being unable to be used.

SUMMARY

The embodiment of the present document provides a method, apparatus and system for a secondary system registering in a database, to solve the problem in the related art that secondary systems interfere with each other because of the lack of the registration process.

The embodiment of the present document provides a method for a secondary system registering in a database, comprising:

a database receiving a registration request sent by a secondary system; and the database processing the registration of the secondary system.

The abovementioned method may further have the following feature:

the registration request refers to a registration request message sent by the secondary system to the database when a network element device or a reconfiguration management node in the secondary system needs to register in the database.

The abovementioned method may further have the following feature:

the network element device comprises one or more of the following items: a master white spectrum device with control capability, a fixed device, a personal portable device, a base station, and an access point device.

The abovementioned method may further have the following feature:

the reconfiguration management node comprises one or more of the following physical or logical entities: a central control node, a reconfiguration management module, a reconfiguration function module, a reconfiguration entity, an advanced positioning entity, an advanced positioning function, and a coexistence function.

The abovementioned method may further have the following feature:

the registration request message comprises one or more of the following parameters: device type, identification, location information, positioning accuracy, information of host operator, information of the host radio access technology (RAT), contact information, spectrum mask information, out-of-band transmission parameters, stray transmission parameters, transmit power range, antenna height, a propagation model between a device using white spectrums and a receiver in the host system, antenna directivity, main lobe width, and antenna polarization.

The abovementioned method may further have the following feature:

the registration processing comprises: performing a registration process for the network element device when determining that the network element device is an allowed network element device, and/or, performing a registration process for the reconfiguration management node when determining that the reconfiguration management node is an allowed reconfiguration management node.

The abovementioned method may further have the following feature:

the network element device being an allowed network element device refers to that one or more of the following conditions are met:

the network element device is a legitimate user, that is, the network element device is authenticated by the regulatory domain, and the network element device is allowed to occupy white spectrum resources in the current spectrum resource occupancy status, and the network element device does not create potential interference to the master system;

the reconfiguration management node being an allowed reconfiguration management node refers to that one or more of the following conditions are met:

the reconfiguration management node belongs to a legitimate secondary system, that is, the secondary system to which the reconfiguration management node belongs is authenticated by the regulatory domain, the secondary system to which the reconfiguration management node belongs is allowed to occupy white spectrum resources in the current spectrum resource occupancy status, as well as, the secondary system to which the reconfiguration management node belongs does not create potential interference to the master system.

The abovementioned method may further have the following feature:

the registration process refers to, the database storing parameters carried in the registration request, or the database storing the parameters carried in the registration request and assigning a registration code to the network element device or the reconfiguration management node; the registration code refers to an identifier uniquely identifying the network element device or the reconfiguration management node initiating the registration request within a scope of the database or the regulatory domain.

The abovementioned method may further have the following feature:

the registration processing comprises: rejecting the registration request when determining that the network element device is not an allowed network element device and/or the reconfiguration management node is not an allowed reconfiguration management node.

The abovementioned method may further have the following feature: the method further comprises:

the database sending a registration response message to the secondary system after the database completes the registration processing;

wherein, the registration response message comprises a registration success or failure identifier, or besides of the registration success or failure identifier, the registration response message further comprises a registration code, a valid range of registration area and/or a valid time limit of registration information; the registration code refers to an identifier uniquely identifying the network element device or the reconfiguration management node initiating the registration request within a scope of the database or the regulatory domain.

The abovementioned method may further have the following feature: the method further comprises:

the network element device or the reconfiguration management node accessing the database before the secondary system sends a registration request;

wherein, the network element device or the reconfiguration management node accessing the database comprises:

after the regulatory domain provides the secondary system with information of the databases which can provide services for the secondary system, the network element device or the reconfiguration management node selecting and accessing one database according to the information of the database; wherein, the information of the database is identifiers and/or Internet Protocol (IP) addresses of databases;

the network element device or the reconfiguration management node accessing a database which provide services for the network element device or the reconfiguration management node and has established a fixed connection; or the network element device or the reconfiguration management node saving a database list or default initial database information, and the network element device or the reconfiguration management node automatically accessing a database in the database list or a database in the default initial databases after the secondary system is turned on.

The abovementioned method may further have the following feature: the method further comprises:

the network element device or the reconfiguration management node updating the registration information to the database or re-executing the registration process when the network element device or the reconfiguration management node moves out of a preset valid range of registration area and/or the last registration exceeds a preset valid time limit of registration information.

The embodiment of the present document further provides a database device, comprising: a receiving module and a registration processing module; wherein, the receiving module is configured to: receive a registration request sent by a secondary system; and the registration processing module is configured to: process the registration of the secondary system.

The abovementioned database device may further have the following feature:

the secondary system comprises: a network element device and a reconfiguration management node;

the registration processing module is configured to process the registration of the secondary system in the following manner:

performing a registration process for the network element device when determining that the network element device is an allowed network element device, and/or, performing a registration process for the reconfiguration management node when determining that the reconfiguration management node is an allowed reconfiguration management node;

the network element device being an allowed network element device refers to that one or more of the following conditions are met:

the network element device is a legitimate user, that is, the network element device is authenticated by a regulatory domain, the network element device is allowed to occupy white spectrum resources in the current spectrum resource occupancy status, and the network element device does not create potential interference to the master system;

the reconfiguration management node being an allowed reconfiguration management node refers to that one or more of the following conditions are met:

the reconfiguration management node belongs to a legitimate secondary system, that is, the secondary system to which the reconfiguration management node belongs is authenticated by the regulatory domain, the secondary system to which the reconfiguration management node belongs is allowed to occupy white spectrum resources in the current spectrum resource occupancy status, as well as, the secondary system to which the reconfiguration management node belongs does not create potential interference to the master system.

The abovementioned database device may further have the following feature:

the registration processing module is configured to process the registration of the secondary system in the following manner:

storing parameters carried in the registration request, or storing the parameters carried in the registration request and assigning a registration code to the network element device or the reconfiguration management node; wherein the registration code refers to an identifier uniquely identifying the network element device or the reconfiguration management node initiating the registration request within a scope of the database or the regulatory domain.

The abovementioned database device may further have the following feature:

the database device further comprises a sending module; wherein, the sending module is configured to: send a registration response message to the secondary system after the registration processing module completes the registration processing; wherein, the registration response message comprises a registration success or failure identifier, or besides of the registration success or failure identifier, the registration response message further comprises a registration code, a valid range of registration area and/or a valid time limit of registration information; the registration code refers to an identifier uniquely identifying the reconfiguration management node or the network element device initiating the registration request within a scope of the database or the regulatory domain.

The embodiment of the present document further provides a secondary system, comprising: a network element device and a reconfiguration management node; wherein, the network element device comprises a registration requesting module;

the reconfiguration management node comprises a registration requesting module;

the registration requesting module is configured to: send a registration request message to the database when the network element device or the reconfiguration management node needs to register in the database.

The abovementioned secondary system may further have the following feature:

the network element device comprises one or more of the following items: a master white spectrum device with control capability, a fixed device, a personal portable device, a base station, and an access point device.

the reconfiguration management node comprises one or more of the following physical or logical entities: a central control node, a reconfiguration management module, a reconfiguration function module, a reconfiguration entity, an advanced positioning entity, an advanced positioning function, and a coexistence function.

The abovementioned secondary system may further have the following feature:

the registration request message comprises one or more of the following parameters: device type, identification, location information, positioning accuracy, information of the host operator, information of the host radio access technology (RAT), contact information, spectrum mask information, out-of-band transmission parameters, stray transmission parameters, transmit power range, antenna height, a propagation model between a device using white spectrums and a receiver in the host system, antenna directivity, main lobe width, and antenna polarization.

The abovementioned secondary system may further have the following feature:

the network element device comprises an accessing module;

the reconfiguration management node comprises an accessing module;

the accessing module is configured to: access the database before the registration requesting module sends a registration request to the database;

the accessing module is configured to access the database in the following manner:

selecting and accessing one database according to the information, provided by the regulatory domain, of the databases which can provide services for the secondary system; wherein, the information of the database is identifiers and/or Internet Protocol (IP) addresses of databases;

accessing a database which provides services for the network element device or the reconfiguration management node and has established a fixed connection; or accessing a database in the saved database list, or accessing a database in the saved default initial databases.

The abovementioned secondary system may further have the following feature:

the network element device comprises a registration information updating module;

the reconfiguration management node comprises a registration information updating module;

the registration information updating module is configured to: update the registration information to the database or re-execute the registration process when the network element device or the reconfiguration management node moves out of a preset valid range of registration area and/or the last registration exceeds a preset valid time limit of registration information.

The embodiment of the present document provides the process of a secondary system registering in a database, so as to form an implementable mode of the secondary system registering in the database. In addition, the registration scheme provided in the embodiment of the present document can effectively complete the registration task at the same time of simplifying the registration process. With the present scheme, the master system or the regulatory organization can use the registration information to locate the source of interference when the secondary system interferes with the master system; meanwhile the process can coordi-

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

Figure 1:
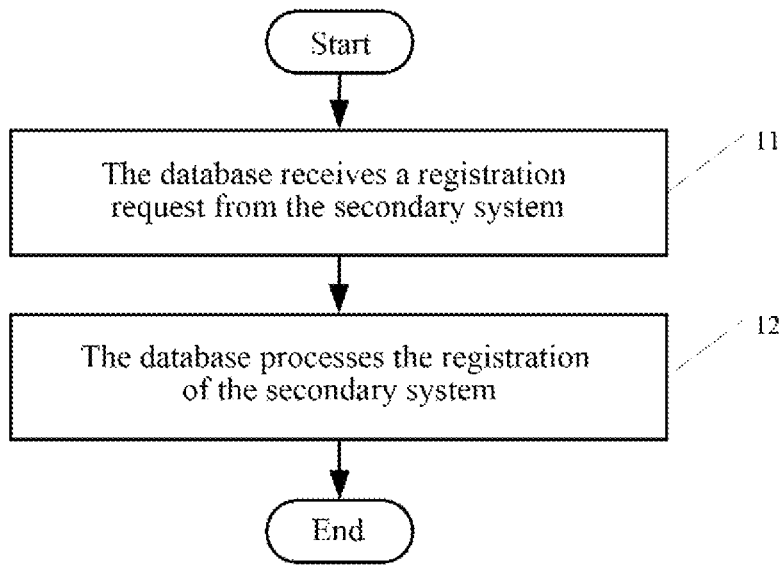
FIG. 1 is a flow chart of a method for a secondary system registering in a database in accordance with an embodiment of the present document.

As shown in FIG. 1, the method for a secondary system registering in a database in accordance with an embodiment of the present document comprises the following steps.

In step 11, the database receives a registration request sent by the secondary system.

In step 12, the database processes the registration of the secondary system.

The registration request refers to a registration request message sent by the secondary system to the database when the network element device or the reconfiguration management node in the secondary system needs to register in the database.

The network element device comprises one or more of the following items: a Master WSD having control capability, a fixed device, a personal portable device, a base station, and an access point device.

The reconfiguration management node comprises one or more of the following physical or logical entities: a central control node (CCP), a reconfiguration management module, a Reconfiguration Function Module, a Reconfiguration Entity (RE), an Advanced Geo-location Entity, an Advanced Geo-location Function, and a Coexistence Function.

The registration request message comprises one or more of the following parameters: device type, identification, location information, positioning accuracy, information of the host operator, information of the host RAT, contact information, spectrum mask information, out-of-band transmission parameters, stray transmission parameters, transmit power range, antenna height, propagation model between the device using the white spectrums and the receiver in the master system, antenna directivity, main lobe width, and antenna polarization.

The registration processing comprises: performing a registration process for the network element device when determining that the network element device is an allowed network element device, and/or, performing a registration process for the reconfiguration management node when determining that the reconfiguration management node is an allowed reconfiguration management node.

The network element device being an allowed network element device refers to that one or more of the following conditions are met: the network element device is a legitimate user, that is, the network element device is authenticated by the regulatory domain, and the network element device is allowed to occupy white spectrum resources in the current spectrum resource occupancy status, and the network element device does not create potential interference to the master system;

the reconfiguration management node being an allowed reconfiguration management node refers to that one or more of the following conditions are met: the reconfiguration management node belongs to a legitimate secondary system, that is, the secondary system to which the reconfiguration management node belongs is authenticated by the regulatory domain, the secondary system to which the reconfiguration management node belongs is allowed to occupy white spectrum resources in the current spectrum resource occupancy status, and the secondary system to which the reconfiguration management node belongs does not create potential interference to the master system.

The registration process refers to, the database storing parameters carried in the registration request, or the database storing the parameters carried in the registration request and assigning a registration code to the network element device or the reconfiguration management node, wherein, the registration code refers to an identifier uniquely identifying the network element device or the reconfiguration management node which initiates the registration request within the scope of the database or the regulatory domain.

The registration processing comprises: rejecting the registration request when determining that the network element device is not an allowed network element device and/or the reconfiguration management node is not an allowed reconfiguration management node.

The method further comprises: after the database completes the registration processing, sending a registration response message to the secondary system; wherein, the registration response message comprises a registration success or failure identifier, or, in addition to the registration success or failure identifier, the registration response message further comprises a registration code, a valid range of registration area and/or a valid time limit of registration information; the registration code refers to an identifier uniquely identifying the network element device or the reconfiguration management node which initiates the registration request within the scope of the database or the regulatory domain.

The method further comprises: the network element device or the reconfiguration management node accessing the database before the secondary system sends a registration request; the mode of accessing the database is one of the following modes:

first, after the regulatory domain provides the secondary system with information of databases which are capable of providing it with services, the network element device or the reconfiguration management node selects and accesses a database according to the database information; wherein, the database information is identifiers and/or IP addresses of the databases;

second, the network element device or the reconfiguration management node accesses the database which provides it with services and has established a fixed connection;

third, the network element device or the reconfiguration management node saves the database list or the default initial database information, after the secondary system is turned on, the network element device or the reconfiguration management node automatically accesses a database in the database list or a database in the default initial databases.

In the following, embodiments are used to describe the implementation mode of the present document in detail.

The First Embodiment

Figure 2:
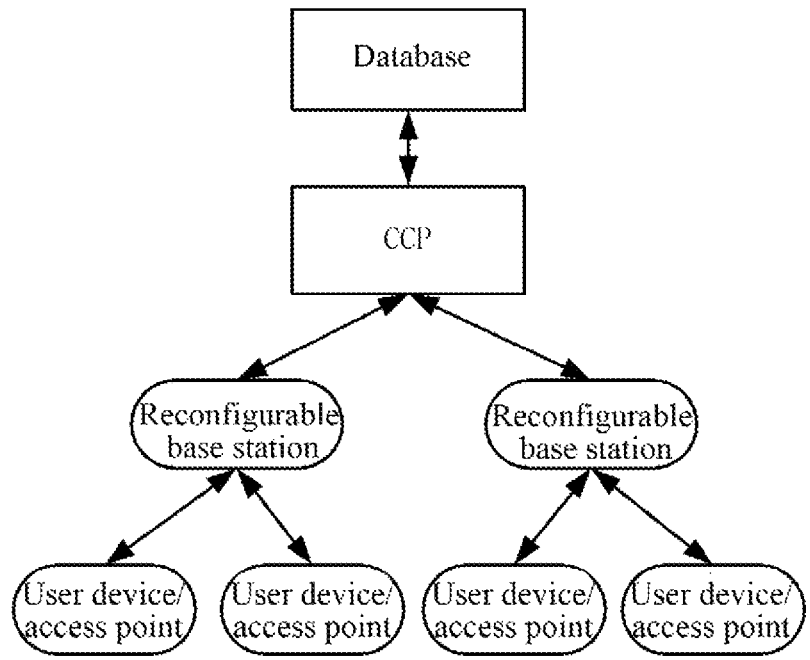
FIG. 2 is a schematic diagram of the structure of a system corresponding to a first embodiment of the present document.
Figure 3:
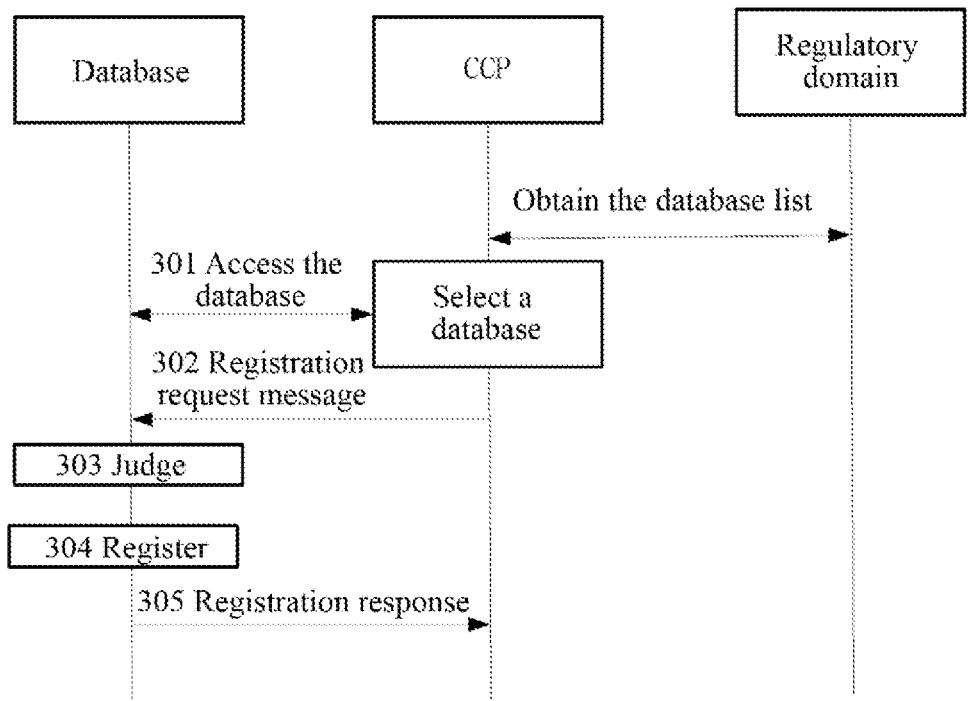
FIG. 3 is a flow chart of a CCP registering in a database corresponding to the first embodiment of the present document.

In the system architecture schematically shown in FIG. 2, the signaling process is shown in FIG. 3 when the reconfiguration management node in the secondary system works as a secondary system representative and registers in the database.

Take a CCP as the reconfiguration management node in the secondary system for example, and in the current architecture, each device in the secondary system acquires the database information via the CCP. In the following, the process of the CCP registering in the database will be described in detail, and the process comprises the steps 301-305.

In step 301, the CCP completes the discovery of the database which serves it, and accesses to the specified database (that is, the Geo-location Database).

The CCP accesses a website which is maintained by the regulatory domain and obtains a database list as well as the uniform resource locator (URL) of each database, the CCP selects one database as its serving database and accesses it according to the URL of the database.

In step 302, the CCP sends a registration request message to the database.

Because it is a registration based on the reconfiguration management node in the secondary system, the registration request message comprises the CCP related information, but does not involve the device information, the parameters comprise: device type supported by the CCP, coverage, CCP identification, information of the host operator, information of the host RAT, as well as contact information.

The CCP supports cellular network devices comprising base stations and terminals; the coverage is the XX City; the CCP identification information can indicate the host of the CCP, that is, the operator to which the CCP belongs to and the used access technology type, for example, the CCP belongs to the Global System for Mobile Communications (GSM) of China Mobile. Alternatively, there may be contact information, such as phone numbers, email addresses, and so on, which can be used as contact mode, and this information is used to contact when the database wants to find out the responsible person of this CCP. If the CCP creates interference to the master system when using the TVWS resources, the database has the responsibility to find out the source of this interference, that is, the contact information can be used to contact.

Step 303, the database judges whether the CCP is allowed to work in the TVWS frequency band or not, that is, whether to accept the registration of the CCP or not, according to the received registration request information.

Consider two factors: the factor of regulatory domain and the factor of resource utilization.

The factor of regulatory domain: judge whether the CCP belongs to a legitimate secondary system or not according to the registration request information, and the database determines that it is a system authorized by the regulatory domain to work in the TVWS according to the GSM, the China Mobile provided by the CCP;

the factor of resource utilization: the database stores the information of TVWS resource occupancy, and learns the occupancy of the TVWS frequency band of the XX city where the CCP is located is 70%, lower than the preset threshold value (such as 90%), thereby allowing the CCP working in the TVWS frequency band.

The comprehensive judgment result is accepting the registration request of the CCP.

In step 304, the database processes the registration of the CCP.

The database saves the CCP related parameters in the registration request message and assigns a registration code such as 0001 to it. The registration code indicates that the CCP registration is successful and all its subsidiary devices are allowed to use the TVWS resources on the one hand; and on the other hand, the registration code is bound with the CCP information, and subsequently when the CCP's subsidiary devices apply for the TVWS resources, the information parameters bound with the registration code do not need to be provided again.

In step 305, reply with a registration response.

The database sends a registration response message to the CCP to notify it that its registration is successful and feeds back with the registration code 0001, so as to complete the registration process of the CCP in the database.

The Second Embodiment

Figure 4:
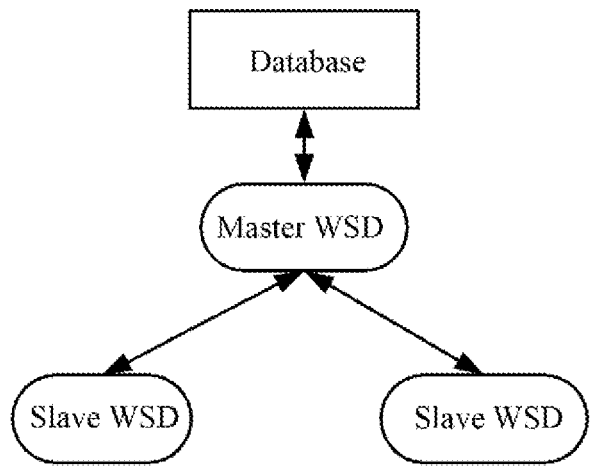
FIG. 4 is a schematic diagram of the architecture of a system corresponding to a second embodiment of the present document.
Figure 5:
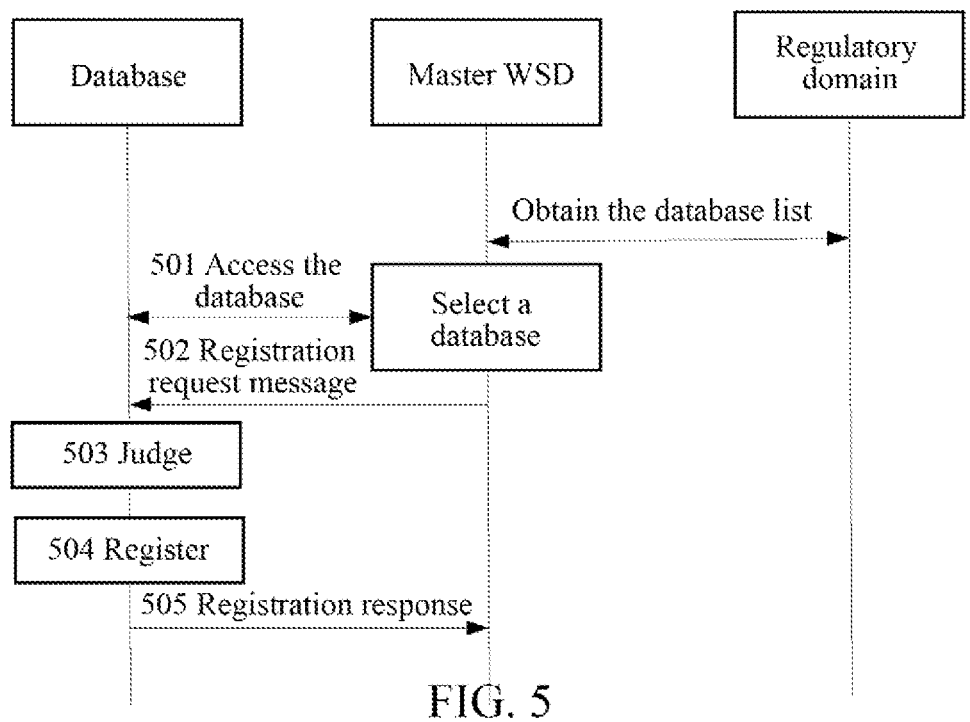
FIG. 5 is a flow chart of a master WSD registering in the database corresponding to the second embodiment of the present document.

In the system architecture schematically shown in FIG. 4, the process of the Master WSD/Fixed device registering in the database is shown in FIG. 5. Wherein, the Master WSD/Fixed device is in the position having the reconfiguration control capability in related device classification in the regulatory domain, the master WSD directly accesses the database to obtain the TVWS information and downwardly connects with the Slaver WSD, and its subsidiary Slaver WSD also indirectly accesses the database through the Master WSD to obtain the TVWS information. Similar to the abovementioned relationship, in the device classification of the secondary system defined by the FCC (Federal Communications Commission), the Fixed Device plays the role equivalent to the Master WSD, its subsidiary Personal Portable Devices need to indirectly obtain the TVWS information of the database through the Fixed Device, or determine the available spectrum through its own spectrum perception. It can be seen that, the Master WSD/Fixed device in the secondary system is in the reconfiguration control position, and the regulatory domain requires these nodes to register in the database. In the following, take the Master WSD as an example to describe its registration process in the database in detail, comprising steps 501-505.

In step 501, the Master WSD completes the discovery of its serving database, and accesses the specified database (that is, the Geo-location Database).

The master WSD queries the regulatory domain maintaining the database list for the database list, and after acquiring the list of available databases at the position of the Master WSD as well as the URL of each database, the Master WSD selects one database as its serving database and accesses it according to the URL of the database.

When the Master WSD sends a database service query message to the regulatory domain, it needs to provide the coordinates of its location, the positioning accuracy and the coverage information. For example, the geographic coordinates of the Master WSD are: longitude 67° and latitude 36°. The positioning accuracy is 100 m, the coverage radius is 500 m, and the management domain can determine through the information the database resources able to completely cover the Master WSD.

In step 502, the Master WSD sends a registration request message to the database.

The registration request message needs to comprise the information of the system to which the Master WSD belongs, and the Master WSD own related information, the parameters comprise: the coordinates of the position where the Master WSD is located, positioning accuracy, device identification, information of the host operator, information of the host RAT, contact information, spectrum mask information, transmit power range, antenna height range, propagation model between the position using the TVWS and the receiver in the master system, antenna directivity, main lobe width, and antenna polarization.

Figure 6:
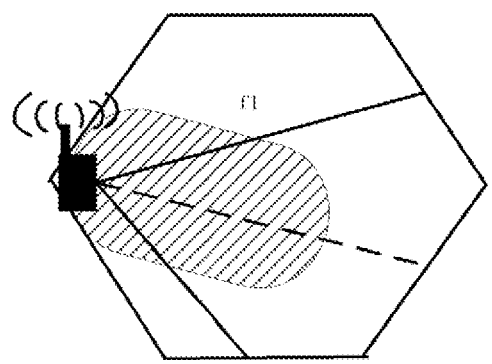
FIG. 6 is a schematic diagram of spectrum mask, antenna directivity and main lobe width of the master WSD corresponding to the second embodiment of the present document.

For example, the geo-location coordinates of the Master WSD are: longitude 67° and latitude 36°; the positioning accuracy is 100 m; the Master WSD identification information is a device ID assigned by the regulatory domain; the Master WSD belongs to the GSM of China Mobile; the contact information such as phone number, e-mail address, and so on can be used as contact mode, and this information is used to contact when the database wants to find out the person responsible for this device. If the usage of the obtained TVWS resources by the Master WSD creates interference to the master system, the database has the responsibility to find out and notify the device of this interference source to stop working through the contact mode. The transmission parameter information is: spectrum mask, antenna directivity and main lobe width as shown in FIG. 6, wherein, the antenna directivity of the base station is shown by the dotted line in FIG. 6, the main lobe width is the angle composed between two solid lines, the shaded portion is its coverage. The transmit power range is 40-100 mW equivalent isotropic radiated power (EIRP), and the antenna polarization is horizontal polarization.

In step 503, the database judges whether the Master WSD is allowed to work in the TVWS frequency band or not, namely, whether to accept the registration of the Master WSD or not, based on the received registration request information.

Three factors are considered: the factor of regulatory domain, the factor of resource utilization and the factor of potential interference:

the factor of regulatory domain: judge whether the Master WSD belongs to a legitimate secondary system or not according to the registration request information, the database determines that it is a Master WSD of the secondary system which is authorized by the regulatory domain to work in the TVWS according to the device ID as well as the GSM, China Mobile provided by the Master WSD;

the factor of resource utilization: the database stores information of the TVWS resource occupancy, when it is known that the TVWS frequency band occupancy rate is 70%, lower than the preset threshold (for example, 90%), within the coverage of the Master WSD (the coverage is determined according to the position coordinates of the Master WSD, the antenna directivity, the main lobe width, the transmit power range, as well as the propagation model), then allows the Master WSD working in the TVWS frequency band.

The factor of potential interference: the database judges according to the stored information of other registered secondary systems and the number of current TVWS, and there are five secondary systems registered on the relevant area covered by the host Master WSD (the relevant area covered by the Master WSD refers to the area in which the master system can create interference superimposition), and there are four TVWS resources in the current location, the number of secondary systems is greater than the number of TVWS resources, therefore there must be secondary systems sharing the same TVWS spectrum, at this time the secondary systems sharing the same TVWS can create superimposed interference to the master user. For example, the registered secondary systems are A1-A5, and the available TVWS spectrums are band1-band4, the A1 and the A2 share the resource of the band1, and the A3-A5 respectively use the band2-band4, the secondary system is called A6, its access is bound to sharing the same TVWS spectrum with another secondary system, based on which the database judges whether there are resources on the band1-band4 being able to withstand interference besides of the A1-A5. The maximum withstanding interference and the subjected interference of the band1-band4 are respectively: band1:$I_{max}$10 mW, $I_{1+2}$=10 mW; band2:$I_{max}$=20 mW, $I_3$=20 mW; band3: $I_{max}$=20 mW, $I_4$=15 mW; band4:$I_{max}$=10 mW, $I_5$=5 mW; the judgment result is that the band3 and the band4 can withstand additional interference, therefore it can accept the registration of the Master WSD.

The registration request of the Master WSD is accepted in combination of the above three factors.

In step 504, the database registers the Master WSD.

The database saves the Master WSD relevant parameters in the registration request message and assigns a registration code such as 0001 to it. The registration code indicates that the Master WSD is registered successfully and is a system allowed to use the TVWS resources on the one hand; and on the other hand, the registration code is bound with the Master WSD Information, and subsequently when a subsidiary device of the Master WSD applies for the TVWS resources, the information parameters bound with the registration code do not need to be provided again.

In step 505, reply with a registration response.

The database sends a registration response message to the Master WSD to notify it that the registration is successful, and feeds back with the registration code 0001. The registration process of the Master WSD in the database is completed.

The Third Embodiment

Figure 7:
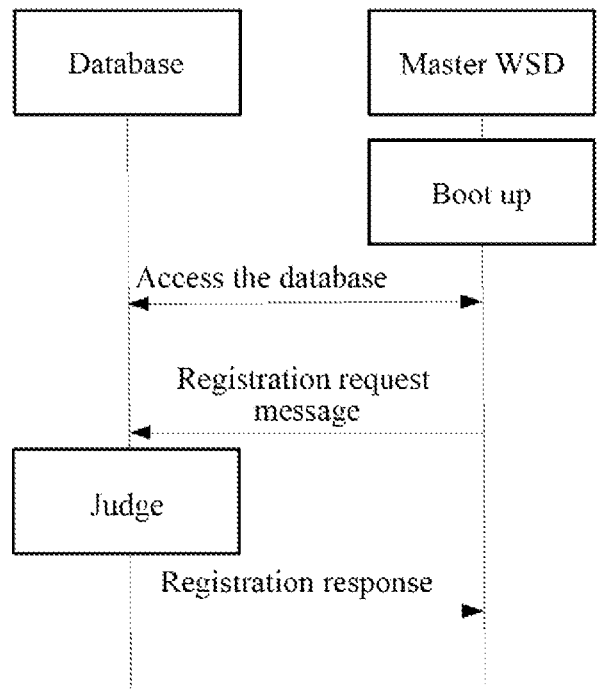
FIG. 7 is a flow chart of a registration when the master WSD and a database have a fixed connection corresponding to a third embodiment of the present document.

In the system architecture shown in FIG. 4, when there is a fixed connection between the database and the Master WSD, the registration process of the Master WSD is shown in FIG. 7, and in the following, the registration process will be described in detail.

Since the Master WSD has a fixed connection with its serving database, the Master WSD in the present embodiment does not need to perform the step of finding the database, therefore, after the Master WSD is turned on, it directly sends a registration request message to the database which has a fixed connection with it; carrying the parameters and the subsequent process are the same as the second method embodiment and are not repeated here.

The Fourth Embodiment

Figure 8:
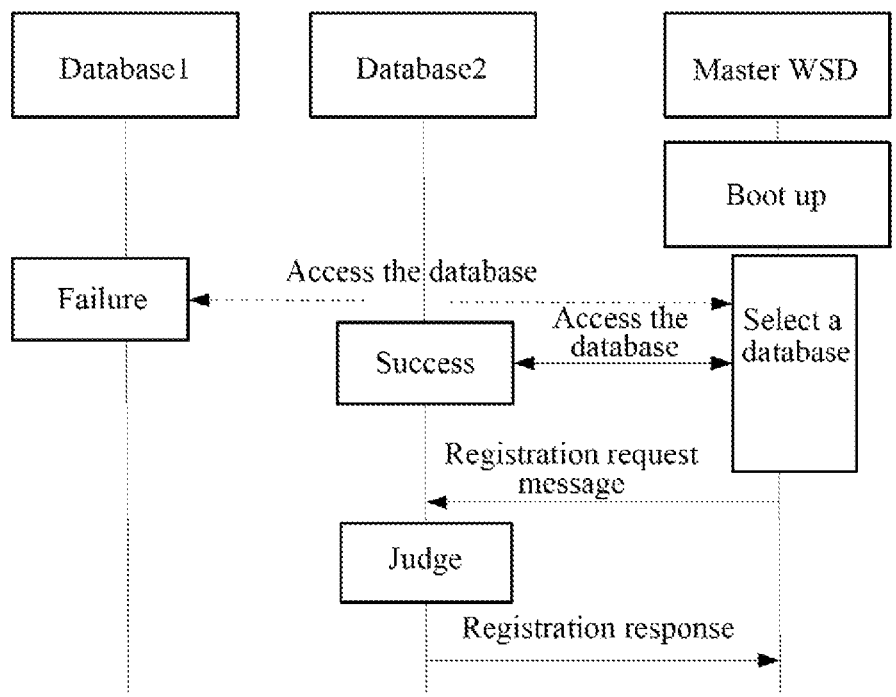
FIG. 8 is a flow chart of registration when the master WSD has a databases list corresponding to a fourth embodiment of the present document.

In the system architecture shown in FIG. 4, when the Master WSD saves the database list, the registration process of the Master WSD is shown in FIG. 8, and the registration process will be described in detail in the following.

Because the Master WSD saves the database list, the process of the Master WSD determining the serving database in this embodiment does not need the aid of the inquiry by the regulatory domain, therefore after the Master WSD is turned on, it tries to access the databases in the list one by one in its list, and when the access is successful, the database discovery process completes, then it sends a registration request message to the accessed database; carrying the parameters and the subsequent process are the same as the second embodiment and are not repeated here.

Figure 9:
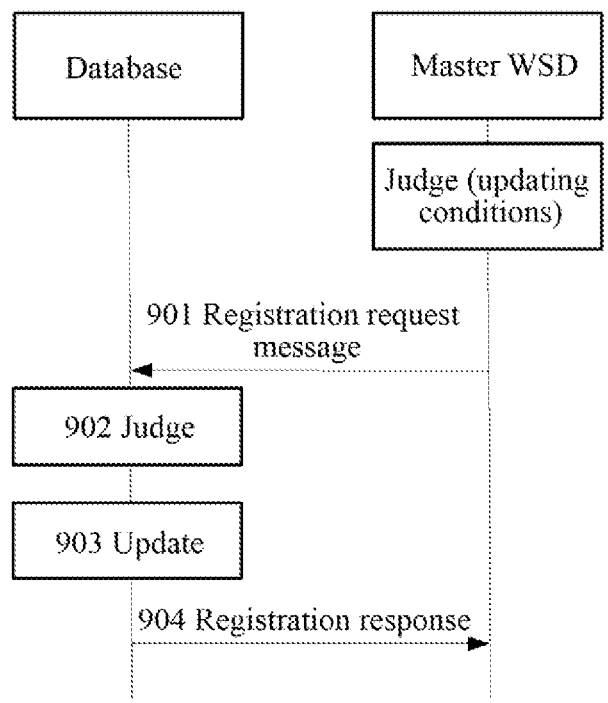
FIG. 9 is a flow chart of a registration information updating process in accordance with an embodiment of the present document.

In this method, when the network element device or the reconfiguration management node moves out of the preset valid range of registration area and/or the last registration exceeds the preset valid time limit of registration information, update the registration information to the database or re-execute the registration process. As shown in FIG. 9, the registration information updating process will be described in detail in the following.

As the process described in the method embodiments 1 and 2, alternatively, when the database replies with a registration response message, registration information updating conditions are preset for the secondary system at the same time, take the method embodiment 2 for example, it is set that when the Master WSD moves out of the valid range of the registration area (for example the moving distance>500 m), or the time is longer than the valid time limit of the registration information (for example, the time length from the last registration>1 h), then it needs to initiate a registration information updating process.

By positioning, the Master WSD in the secondary system finds out that it moves by 510 m compared with the location coordinates provided when registering in the database last time, and exceeds the valid range of registration area, thus initiating a registration information updating process, including steps 901-904.

In step 901, the Master WSD sends new location coordinates along with the registration code to the database.

In step 902, the database judges whether to accept the registration of the Master WSD in the new location or not. For example, it can judge according to the resource utilization in the new location, and reject it if the TVWS resource utilization in the new location exceeds the 90% of the preset threshold. In the present embodiment, the resource utilization does not reach the threshold and therefore the registration update of the Master WSD is allowed.

In step 903, the database updates the position coordinates of the Master WSD corresponding to the registration code.

In step 904, the database feeds back with a registration response, and replies that the registration information update is successful.

Figure 10:
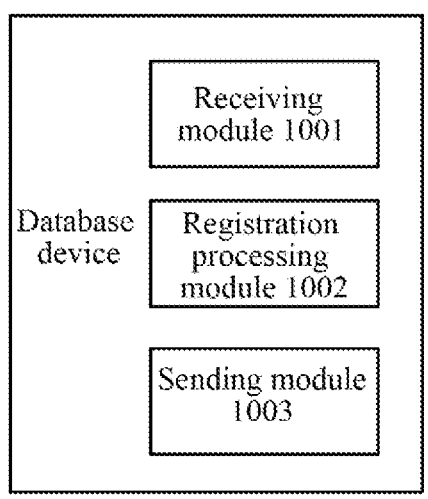
FIG. 10 is a structural diagram of a database device in accordance with an embodiment of the present document.

As shown in FIG. 10, the database device in the present scheme comprises receiving module 1001 and registration processing module 1002; wherein, the receiving module 1001 is used to receive a registration request sent by the secondary system;

the registration processing module 1002 is used to process the registration of the secondary system.

The registration processing module 1002 is used to: perform an registration process for the network element device when determining that the network element device is an allowed network element device, and/or, perform the registration process for the configuration management node when determining that the reconfiguration management node is an allowed reconfiguration management node;

the network element device being an allowed network element device refers to that one or more of the following conditions are met: the network element device is a legitimate user, that is, the network element device is authenticated by the regulatory domain, the network element device is allowed to occupy white spectrum resources in the current spectrum resource occupancy status, and the network element device does not create potential interference to the master system;

the reconfiguration management node being an allowed reconfiguration management node refers to that one or more of the following conditions are met: the reconfiguration management node belongs to a legitimate secondary system, that is, the secondary system to which the reconfiguration management node belongs is authenticated by the regulatory domain, the secondary system to which the reconfiguration management node belongs is allowed to occupy the white spectrum resources in the current spectrum resource occupancy status, as well as, the secondary system to which the reconfiguration management node belongs does not create potential interference to the master system.

the registration processing module 1002 is used to process the registration of the secondary system in the following manner:

storing the parameters carried in the registration request, or storing the parameters carried in the registration request and assigning a registration code to the network element device or the reconfiguration management node; wherein the registration code refers to an identifier uniquely identifying the network element device or the reconfiguration management node initiating the registration request within the database or the regulatory domain.

The database device further comprises sending module 1003;

the sending module 1003 is used to: send a registration response message to the secondary system after the registration processing module completes the registration processing; wherein, the registration response message comprises a registration success or failure identifier, or besides of the registration success or failure identifier, the registration response message further comprises a registration code, a valid range of registration area and/or a valid time limit of registration information; the registration code refers to an identifier uniquely identifying the reconfiguration management node or the network element initiating the registration request within the database or the regulatory domain.

Figure 11:
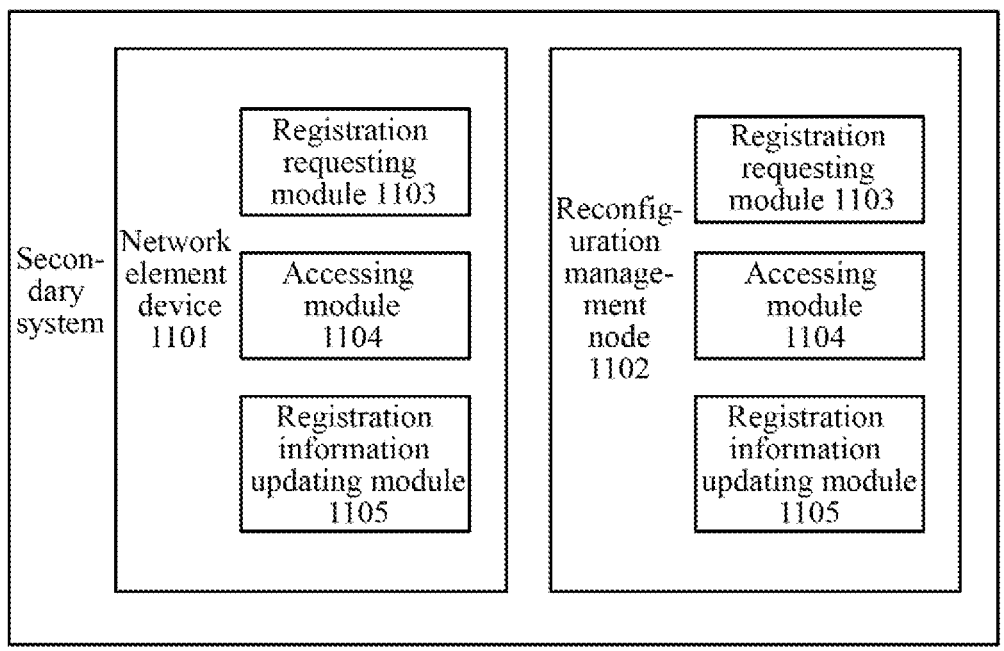
FIG. 11 is a structural diagram of a secondary system in accordance with an embodiment of the present document.

As shown in FIG. 11, the secondary system in the present scheme comprises network element device 1101 and reconfiguration management node 1102; wherein, the network element device 1101 comprises registration requesting module 1103;

the reconfiguration management node 1102 comprises the registration requesting module 1103;

the registration requesting module 1103 is used to: when the network element device or the reconfiguration management node needs to register in the database, the secondary system sends a registration request to the database.

The network element device 1101 comprises one or more of the following items: a white spectrum device with control capability, a fixed device, a personal portable device, a base station, and an access point device.

The reconfiguration management node 1102 comprises one or more of the following physical or logical entities: a central control node, a reconfiguration management module, a reconfiguration function module, a reconfiguration entity, an advanced positioning entity, an advanced positioning function, and a coexistence function.

The registration request message comprises one or more of the following parameters: device type, identification, location information, positioning accuracy, information of the host operator, information of the host radio access technology (RAT), contact information, spectrum mask information, out-of-band transmission parameters, stray transmission parameters, transmit power range, antenna height, propagation model between a device using the white spectrums and a receiver in the host system, antenna directivity, main lobe width, and antenna polarization.

The network element device 1101 comprises accessing module 1104;

the reconfiguration management node 1102 comprises the accessing module 1104;

the accessing module 1104 is used to access the database before the registration requesting module sends a registration request to the database;

the accessing module 1104 is used to access the database in the following manner:

selecting and accessing a database according to the information, provided by the regulatory domain, of the databases which can provide services for the secondary system; wherein, the database information is identifiers and/or Internet Protocol (IP) addresses of databases;

accessing the database which can provide services therefor and has established a fixed connection; or accessing a database in the saved database list, or accessing a database in the saved default initial databases.

The network element device 1101 comprises registration information updating module 1105;

the reconfiguration management node 1102 comprises the registration information updating module 1105;

the registration information updating module 1105 is used to update the registration information to the database or re-execute the registration process when the network element device or the reconfiguration management node moves out of the preset valid range of the registration area and/or the last registration exceeds the preset valid time limit of the registration information.

The embodiment of the present document provides the process of the secondary system registering in the database, and an implementable mode of the secondary system registering in the database can be formed via parameters involved in the signaling interaction process. In addition, via the registration scheme given in the embodiment of the present document, it is possible to effectively complete the registration task at the same time of simplifying the registration process.

Of course, the present document may have a variety of other embodiments, and without departing from the spirit and essence of the present document, a person skilled in the art can make various changes and modifications according to the embodiments of the present document, and these respective changes and modifications belong to the protection scope of the appended claims of the present document.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

With the scheme provided in the embodiment of the present document, an implementable mode of the secondary system registering in the database is formed; the registration task can be effectively completed at the same time of simplifying the registration process; and the interference between different secondary systems can be reduced.

What is claimed is:

1. A method for a secondary system registering in a database, comprising:

the database receiving a registration request sent by the secondary system; and the database processing the registration of the secondary system;

wherein, the registration request refers to a registration request message sent by the secondary system to the database when a network element device in the secondary system or a reconfiguration management node of the secondary system needs to register in the database;

wherein, the network element device comprises one or more of the following items: a master white spectrum device with control capability, a fixed device, a personal portable device, a base station, and an access point device;

wherein, the registration processing comprises: performing a registration process for the network element device when determining that the network element device is an allowed network element device, and performing a registration process for the reconfiguration management node when determining that the reconfiguration management node is an allowed reconfiguration management node;

wherein, the network element device or the reconfiguration management node accessing the database before the secondary system sends a registration request;

wherein, the network element device or the reconfiguration management node accessing the database comprises:

after the regulatory domain provides the secondary system with information of the databases which can provide services for the secondary system, the network element device or the reconfiguration management node selecting and accessing one database according to the information of the databases; wherein, the information of the databases is identifiers and Internet Protocol (IP) addresses of databases;

the network element device or the reconfiguration management node accessing a database which provide services for the network element device or the reconfiguration management node and has established a fixed connection; or the network element device or the reconfiguration management node saving a database list or default initial database information, and the network element device or the reconfiguration management node automatically accessing a database in the database list or a database in the default initial databases after the secondary system is turned on.

2. The method of claim 1, wherein, the reconfiguration management node comprises one or more of the following physical or logical entities: a central control node, a reconfiguration management module, a reconfiguration function module, a reconfiguration entity, an advanced positioning entity, an advanced positioning function, and a coexistence function.

3. The method of claim 1, wherein, the registration request message comprises one or more of the following parameters: device type, identification, location information, positioning accuracy, information of host operator, information of host radio access technology (RAT), contact information, spectrum mask information, out-of-band transmission parameters, stray transmission parameters, transmit power range, antenna height, a propagation model between a device using white spectrums and a receiver in the host system, antenna directivity, main lobe width, and antenna polarization.

4. The method of claim 1, wherein, the network element device being an allowed network element device refers to that one or more of the following conditions are met:

the network element device is a legitimate user, that is, the network element device is authenticated by the regulatory domain, and the network element device is allowed to occupy white spectrum resources in the current spectrum resource occupancy status, and the network element device does not create potential interference to the master system;

the reconfiguration management node being an allowed reconfiguration management node refers to that one or more of the following conditions are met:

the reconfiguration management node belongs to a legitimate secondary system, that is, the secondary system to which the reconfiguration management node belongs is authenticated by the regulatory domain, the secondary system to which the reconfiguration management node belongs is allowed to occupy white spectrum resources in the current spectrum resource occupancy status, as well as, the secondary system to which the reconfiguration management node belongs does not create potential interference to the master system.

5. The method of claim 1, wherein, the registration process refers to, the database storing parameters carried in the registration request, or the database storing the parameters carried in the registration request and assigning a registration code to the network element device or the reconfiguration management node; wherein, the registration code refers to an identifier uniquely identifying the network element device or the reconfiguration management node initiating the registration request within a scope of the database or the regulatory domain;

or, the registration processing comprises: rejecting the registration request when determining that the network element device is not an allowed network element device and/or the reconfiguration management node is not an allowed reconfiguration management node.

6. The method of claim 1, further comprising:

the database sending a registration response message to the secondary system after the database completes the registration processing;

wherein, the registration response message comprises a registration success or failure identifier, or besides of the registration success or failure identifier, the registration response message further comprises a registration code, a valid range of registration area and/or a valid time limit of registration information; the registration code refers to an identifier uniquely identifying the network element device or the reconfiguration management node initiating the registration request within a scope of the database or the regulatory domain.

7. The method of claim 1, further comprising:

the network element device or the reconfiguration management node updating the registration information to the database or re-executing the registration process when the network element device or the reconfiguration management node moves out of a preset valid range of registration area and/or the last registration exceeds a preset valid time limit of registration information.

8. A database device, comprising: a receiving module and a registration processing module; wherein, the receiving module is configured to: receive a registration request sent by a secondary system; and the registration processing module is configured to: process a registration of the secondary system;

wherein, the secondary system comprises: a network element device and a reconfiguration management node;

the registration processing module is configured to process the registration of the secondary system in the following manner:

performing a registration process for the network element device when determining that the network element device is an allowed network element device, and performing a registration process for the reconfiguration management node when determining that the reconfiguration management node is an allowed reconfiguration management node;

the network element device being an allowed network element device refers to that one or more of the following conditions are met:

the network element device is a legitimate user, that is, the network element device is authenticated by a regulatory domain, the network element device is allowed to occupy white spectrum resources in the current spectrum resource occupancy status, and the network element device does not create potential interference to the master system;

the reconfiguration management node being an allowed reconfiguration management node refers to that one or more of the following conditions are met:

the reconfiguration management node belongs to a legitimate secondary system, that is, the secondary system to which the reconfiguration management node belongs is authenticated by the regulatory domain, the secondary system to which the reconfiguration management node belongs is allowed to occupy white spectrum resources in the current spectrum resource occupancy status, as well as, the secondary system to which the reconfiguration management node belongs does not create potential interference to the master system.

9. The database device of claim 8, wherein, the registration processing module is configured to process the registration of the secondary system in the following manner:

storing parameters carried in the registration request, or storing the parameters carried in the registration request and assigning a registration code to the network element device or the reconfiguration management node; wherein the registration code refers to an identifier uniquely identifying the network element device or the reconfiguration management node initiating the registration request within a scope of the database or the regulatory domain.

10. The database device of claim 8, further comprising: a sending module; wherein, the sending module is configured to: send a registration response message to the secondary system after the registration processing module completes the registration processing; wherein, the registration response message comprises a registration success or failure identifier, or besides of the registration success or failure identifier, the registration response message further comprises a registration code, a valid range of registration area and/or a valid time limit of registration information; the registration code refers to an identifier uniquely identifying the reconfiguration management node or the network element device initiating the registration request within a scope of the database or the regulatory domain.

11. A secondary system, comprising: a network element device and a reconfiguration management node; wherein, the network element device comprises a registration requesting module;

the reconfiguration management node comprises a registration requesting module;

the registration requesting module is configured to: send a registration request message to the database when the network element device or the reconfiguration management node needs to register in the database;

wherein, the network element device comprises one or more of the following items: a master white spectrum device with control capability, a fixed device, a personal portable device, a base station, and an access point device;

wherein, the network element device comprises an accessing module;

the reconfiguration management node comprises an accessing module;

the accessing module is configured to: access the database before the registration requesting module sends a registration request to the database;

the accessing module is configured to access the database in the following manner:

selecting and accessing one database according to the information, provided by the regulatory domain, of the databases which can provide services for the secondary system; wherein, the information of the database is identifiers and Internet Protocol (IP) addresses of databases;

accessing a database which provides services for the network element device or the reconfiguration management node and has established a fixed connection; or accessing a database in the saved database list, or accessing a database in the saved default initial databases.

12. The secondary system of claim 11, wherein, the reconfiguration management node comprises one or more of the following physical or logical entities: a central control node, a reconfiguration management module, a reconfiguration function module, a reconfiguration entity, an advanced positioning entity, an advanced positioning function, and a coexistence function.

13. The secondary system of claim 11, wherein, the registration request message comprises one or more of the following parameters: device type, identification, location information, positioning accuracy, information of the host operator, information of the host radio access technology (RAT), contact information, spectrum mask information, out-of-band transmission parameters, stray transmission parameters, transmit power range, antenna height, a propagation model between a device using white spectrums and a receiver in the host system, antenna directivity, main lobe width, and antenna polarization.

14. The secondary system of claim 11, wherein, the network element device comprises a registration information updating module;

the reconfiguration management node comprises a registration information updating module;

the registration information updating module is configured to: update the registration information to the database or re-execute the registration process when the network element device or the reconfiguration management node moves out of a preset valid range of registration area and/or the last registration exceeds a preset valid time limit of registration information.

* * * * *